United States Patent
Bottorff et al.

(10) Patent No.: US 10,958,481 B2
(45) Date of Patent: Mar. 23, 2021

(54) TRANSFORMING A SERVICE PACKET FROM A FIRST DOMAIN TO A SECOND DOMAIN

(71) Applicant: Hewlett Packard Enterprise Development LP, Houston, TX (US)

(72) Inventors: Paul Allen Bottorff, Roseville, CA (US); Don Fedyk, Andover, MA (US); Barak Perlman, Petach Tikva (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 55 days.

(21) Appl. No.: 16/097,241

(22) PCT Filed: Apr. 29, 2016

(86) PCT No.: PCT/US2016/030133
§ 371 (c)(1),
(2) Date: Oct. 27, 2018

(87) PCT Pub. No.: WO2017/188994
PCT Pub. Date: Nov. 2, 2017

(65) Prior Publication Data
US 2019/0116063 A1    Apr. 18, 2019

(51) Int. Cl.
*H04L 12/66* (2006.01)
*H04L 12/725* (2013.01)
(Continued)

(52) U.S. Cl.
CPC .......... *H04L 12/66* (2013.01); *H04L 12/4645* (2013.01); *H04L 45/04* (2013.01);
(Continued)

(58) Field of Classification Search
CPC ... H04L 69/22; H04L 45/306; H04L 12/4641; H04L 12/66; H04L 47/24; H04L 12/4645;
(Continued)

(56) References Cited

U.S. PATENT DOCUMENTS 8,041,335 B2 * 10/2011 Khetawat .............. H04W 12/08
                                                    455/404.2
8,375,144 B2    2/2013 Bunch et al.
(Continued)

FOREIGN PATENT DOCUMENTS

WO    2012/082988 A1    6/2012
WO    WO-2013013726 A1  1/2013
WO    2016/045710 A1    3/2016

OTHER PUBLICATIONS

D. Dolson et al. "Hierarchical Service Function Chaining; draft-dolson-sfc-hi erarchi cal -05. txt", Mar. 7, 2016; pp. 1-28, Retrieved from the Internet on Oct. 17, 2018 at URL: <tools.ietf.org/html/draft-dolson-sfc-hierarchical-05>.
(Continued)

*Primary Examiner* — Tesfay Yohannes
(74) *Attorney, Agent, or Firm* — Hewlett Packard Enterprise Patent Department

(57) ABSTRACT

In an example, a hierarchical chaining gateway (hCG) includes a first communication interface corresponding to a first domain using a first chaining protocol, and a second communication interface corresponding to a second domain using a second and different chaining protocol. The hCG receives a service packet including a first service function chain header via the first communication interface. The hCG also identifies a key identifier in the service packet, and retrieves a second service function chain header based on the key identifier. Then, the hCG transforms the service packet by substituting the first service function chain header corresponding to first domain in the service packet with the second service function chain header corresponding to the second domain. Next, the hCG transmits the service packet
(Continued)

including the second service function chain header via the second communication interface corresponding to the second domain.

20 Claims, 8 Drawing Sheets

(51) Int. Cl.
*H04L 12/715* (2013.01)
*H04L 12/851* (2013.01)
*H04L 12/46* (2006.01)
*H04L 12/723* (2013.01)
*H04L 29/12* (2006.01)
*H04L 29/06* (2006.01)

(52) U.S. Cl.
CPC ............ *H04L 45/306* (2013.01); *H04L 45/50* (2013.01); *H04L 47/24* (2013.01); *H04L 47/2483* (2013.01); *H04L 61/6022* (2013.01); *H04L 69/22* (2013.01)

(58) Field of Classification Search
CPC . H04L 45/50; H04L 47/2483; H04L 61/6022; H04L 45/04; G06F 15/16
USPC .......................................... 709/238; 370/392
See application file for complete search history.

(56) References Cited

U.S. PATENT DOCUMENTS

| | | | |
|---|---|---|---|
| 9,178,812 B2 | 11/2015 | Guichard et al. | |
| 2006/0039313 A1* | 2/2006 | Chou ..................... | H04L 47/70 370/328 |
| 2008/0076425 A1* | 3/2008 | Khetawat .......... | H04W 12/1202 455/436 |
| 2009/0000654 A1* | 1/2009 | Rotzoll .................. | H02J 3/385 136/244 |
| 2012/0233547 A1* | 9/2012 | McLachlan ............ | G06Q 10/06 715/733 |
| 2015/0092564 A1 | 4/2015 | Aldrin | |
| 2015/0263901 A1* | 9/2015 | Kumar .................... | H04L 45/02 370/254 |
| 2015/0295750 A1 | 10/2015 | Blanco et al. | |
| 2015/0295831 A1* | 10/2015 | Kumar .................. | H04L 47/125 370/235 |
| 2016/0014016 A1 | 1/2016 | Guichard et al. | |
| 2016/0099864 A1* | 4/2016 | Akiya ..................... | H04L 45/28 370/216 |
| 2016/0164776 A1* | 6/2016 | Biancaniello ........... | H04L 69/22 370/392 |
| 2016/0165014 A1* | 6/2016 | Nainar .................... | H04L 45/04 370/392 |
| 2016/0277188 A1* | 9/2016 | Quinn ..................... | H04L 63/06 |
| 2017/0005920 A1* | 1/2017 | Previdi ................. | H04L 45/507 |
| 2017/0244631 A1* | 8/2017 | Guichard ................ | H04L 45/50 |
| 2017/0251065 A1* | 8/2017 | Furr ........................ | H04L 45/64 |
| 2017/0279712 A1* | 9/2017 | Nainar ................ | H04L 12/4641 |
| 2017/0289032 A1* | 10/2017 | Guichard ............ | H04L 12/4641 |

OTHER PUBLICATIONS

D. Dolson et al., "Hierarchical Service Chaining," Jun. 19, 2015, pp. 1-13, Internet Draft. Retrieved from Internet on Oct. 17, 2018 from URL: <tools.ietf.org/html/draft-dolson-sfc-hierarchical-01>.
International Search Report and Written Opinion, International Application No. PCT/US2016/030133, dated Jan. 20, 2017, pp. 1-11, KIPO.
ZTE Corporation; Hierarchical SFC for DC Interconnection draft-ao-sfc-for-dc-interconnect--01.txt; Oct. 15, 2015; , pp. 1-9; Retrieved from the Internet on Oct. 17, 2018 at URL: <tools.ietf.org/html/draft-ao-sfc-for-dc-interconnect-01>.
C. Filsfils, Ed et al., "Segment Routing Architecture", draft-ietf-spring-segment-routing-04, Jul. 31, 2015, 22 pages.
D. Dolson et al., "Hierarchical Service Chaining", draft-dolson-sfc-hierarchical-02, Jul. 6, 2015, 17 pages.
J. Halpern, Ed. et al., "Service Function Chaining (SFC) Architecture", draft-ietf-sfc-architecture-11, Jul. 24, 2015, 31 pages.
Supplementary European Search Report and Search Opinion Received for EP Application No. 16895738.9, dated Oct. 9, 2018, 12 pages.

* cited by examiner

TRANSFORMING A SERVICE PACKET FROM A FIRST DOMAIN TO A SECOND DOMAIN

BACKGROUND

Network function virtualization (NFV) generally refers to a network architecture that uses the technologies of information technology (IT) virtualization to virtualize entire classes of network node functions into building blocks that may connect, or chain together, to create communication services. To implement NFV, packets need to be passed through a specific series of virtual and physical service functions (also known as "Service Function Chain") before delivered to their destinations. A chaining gateway generally refers to a physical or virtual network component that couples at least two domains, each of which includes different sets of service function chains.

BRIEF DESCRIPTION OF THE DRAWINGS

The following detailed description references the drawings, wherein.

DETAILED DESCRIPTION

Figure 1:
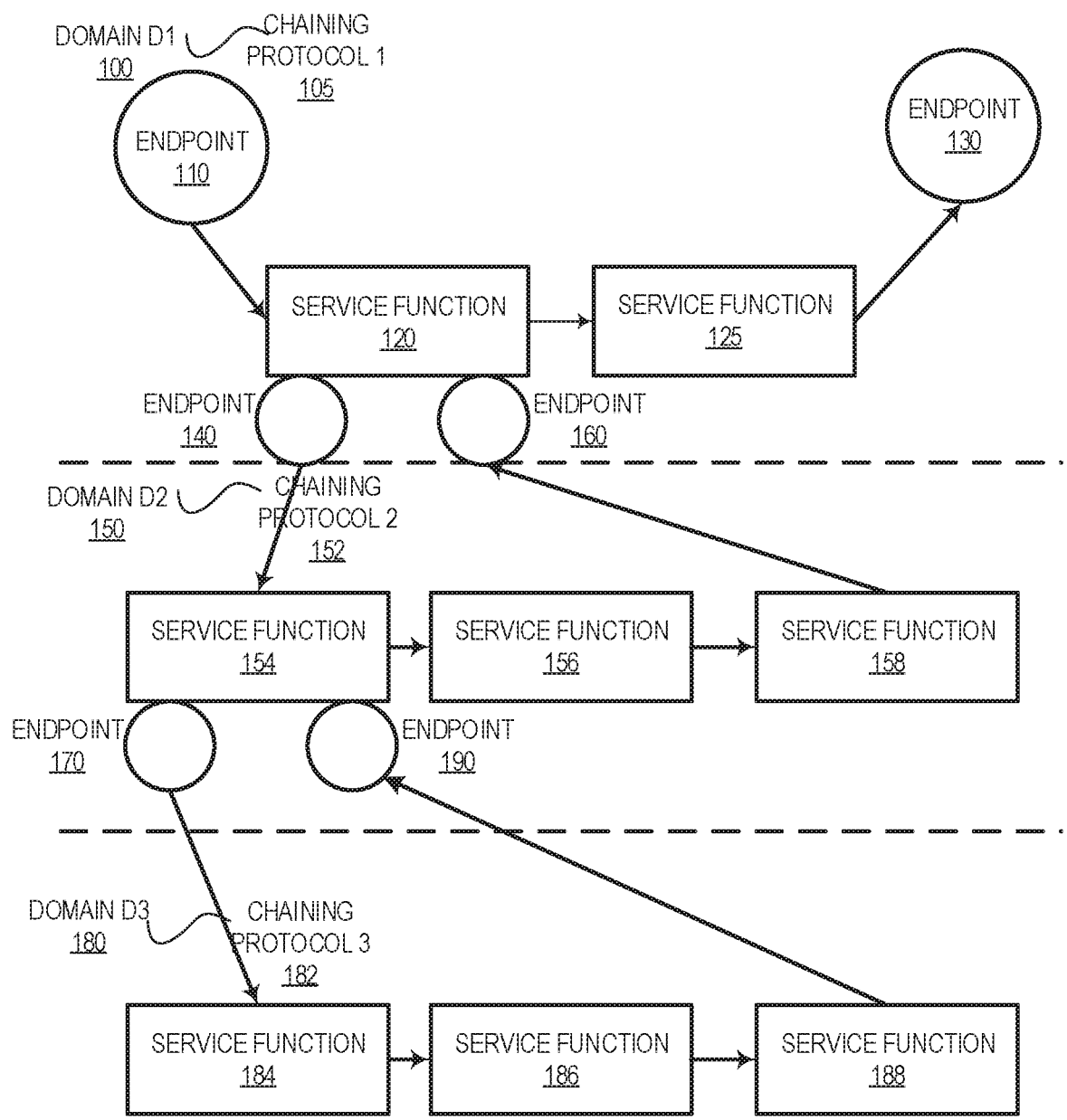
FIG. 1 is a block diagram of an example networking environment for large scale network service chains in which hierarchical Chaining Gateways (hCGs) are deployed.

Service functions generally refer to those services, processes, operations, and/or functions, which may be administered by a provider to add value to packet transportation and processing. For example, the service functions may include, but are not limited to, those services that add value, control quality of service, enhance privacy, and/or provide internal tracking mechanisms. Examples of the service functions may include deep packet inspection (DPI), firewalls, tracking packet sizes, encryption, decryption, latency improvements, improvements in resolving addresses, improvements in transferring information to cover packet losses, network address translation, post-identification inspection, network forwarding policy, layer four to layer seven (L4-L7) switching, multiprotocol label switching (MPLS), virtual local area network (VLAN) switching, meta-data switching, hypertext transfer protocol (HTTP) enhancement, data caching, accounting, parental controls, call blocking, call forwarding, etc. The deployment of these service functions is based on the ability to create service function chains and/or pipelines, which are instances of these service functions, and on the traffic flows through these service functions. Each instance supports at least one flow instance. As such, a service function chain may include multiple service functions and may specify those service functions to be performed on a given packet during transportation.

Service providers today are confronted with rapidly expanding demand for new services. To contain the costs and expedite deployment of new services, the service providers usually virtualize their network services using service function chains. A variety of techniques can be deployed to implement the service function chaining, for example, service function chaining based on Ethernet Media Access Control (MAC) addresses, subscriber-based service function chaining, as well as service function chaining using meta data headers (e.g., Network Server Headers), Segment Routing, and/or Multi-Protocol Label Swapping (MPLS). These techniques, however, cannot support different service function chaining protocols, which are common in the interworking between regions. Moreover, these techniques cannot reduce chain states maintained by service provider networks. Also, these techniques cannot support independence of network control and administration between domains. Therefore, these techniques cannot be scaled to construct large and full featured service provider networks.

Overview

When a subscriber contracts a network service from a service provider, the subscriber's view is that the single organization with which the subscriber contracts owns and operates the facilities providing the services. However, in reality, a service provider commonly uses the facilities of many organizations to deliver a service. Some of these organizations may be internal divisions of a single service provider. Others may be completely different business organizations. Such subcontracting of services can be nested in deep levels. For instance, Service Provider A may subcontract Service Provider B; and, the service provided by Service Provider B may be built in turn from a collection of other subcontractors. Thus, carrier networks can often become recursively nested, which leads to a hierarchy of businesses using a hierarchy of potentially different technologies.

Hence, service function chaining needs to adapt to such recursively nested networks. Specifically, service function chaining according to the disclosed hierarchical Chaining Gateway (hCG) supports nested hierarchies with the ability to hide information between the domains, to adapt to different chain protocols.

According to the present disclosure, hierarchical service function chaining can be implemented using a hierarchical Chaining Gateway (hCG) and a metadata-capable packet header. The hierarchical Chaining Gateway (hCG) hides, from the upper level domain, the sub-domain under the hierarchical Chaining Gateway, and also provides the ability to translate between the chaining protocols of the upper level domain and the lower level domain.

Networking Environment

FIG. 1 is a block diagram of an example networking environment for large scale network service chains in which hCGs are deployed. For illustration purposes only, FIG. 1 includes a plurality of domains, e.g., Domain D1 100, Domain D2 150, and Domain D3 180. The plurality of domains may form a hierarchy. Here, Domain D1 100 is an upper level domain in a hierarchy of domains; Domain D2 150 is a middle level domain in the hierarchy of domains; and, Domain D3 180 is a lower level domain in the hierarchy of domains. Note that, the phrases "upper," "middle," "lower" are used here, for illustration purposes only, to describe the relative relationship between domains in the hierarchy of domains. In another example, Domain D1 100 could be a lower level domain; Domain D2 150 could be a middle level domain; and, Domain D3 180 could be an upper level domain, depending on how the hierarchy of domains are defined.

Moreover, each domain uses a particular chaining protocol. Different domains may use different chaining protocols or share the same chaining protocol. Here, Domain D1 100 uses Chaining Protocol 1 105; Domain D2 150 uses Chaining Protocol 2 152; and, Domain D3 180 uses Chaining Protocol 3 182.

Furthermore, each domain includes at least one service function that forms a service function chain. According to the present disclosure, the service function chain is domain specific. For example, in Domain D1 100, a service function chain starts from endpoint 110, includes service function 120 and service function 125, and ends at endpoint 130. Domain D2 150 includes a service function chain that starts from endpoint 140, passes through service function 154, service function 156, service function 158, and ends at endpoint 160. Likewise, Domain D3 180 includes a service function chain that starts from endpoint 170, passes through service function 184, service function 186, service function 188, and ends at endpoint 190.

Note that, when multiple levels of domains exist in a hierarchy of domains, service function chains are often deeply nested. For example, the service function chain in Domain D1 100 starting from endpoint 110 actually includes service function 120, service function 154, service function 184, service function 186, service function 188, service function 156, service function 158, and service function 125. Without hCGs disclosed herein, the chain header of a service packet can grow quite long as the service packet travels along the nested service function chains across multiple levels of domains. In addition, many more chains are required at Domain D1 100, because each individual chain in Domain D3 180 can have a separate chain in Domain D2 150, and every separate chain in Domain D2 150 can have a separate chain in Domain D1 100. Therefore, the disclosed hCG can effectively compress service packet headers while reducing service function chains.

Also, the domain controller at an upper level domain needs to maintain a large number of states. In the example illustrated in FIG. 1 where Domain D1 100 service function chains include two service functions, Domain D2 150 service function chains include three service functions, and Domain D3 180 service function chains include three service functions, the domain controller in Domain D1 100 would need to maintain at least a total of 18 (2×3×3) states. Note that the number of states maintained at an upper level domain increases exponentially as the level of hierarchies increases.

According to the present disclosure, hierarchical Chaining Gateways (hCGs) are generally deployed between two adjacent levels of domains in a hierarchy of domains. For example, an hCG may be deployed between Domain D1 100 and Domain D2 150; and another hCG may be deployed between Domain D2 150 and Domain D3 180. The hCGs create new endpoints when a service packet enters a new domain, and break the nested service function chains into domain specific chains. Then, when the service packet returns to a previous domain, the hCGs restore the packet header used in the previous domain.

Therefore, in the example described above, instead of maintaining all 18 states, the hCGs avoid state expansion because the hCGs allow Domain D1 100 to only hold states for 2 chains, Domain D2 150 to only hold states for 3 chains, and Domain D3 180 to only hold states for 3 chains. Moreover, besides reducing chain states maintained by service provider networks, the hCG provides protocol translation between different chaining protocols. Also, the hCG supports independence of network control and administration between domains.

Note that the hCG reduces the number of service function chains overall. Specifically, there are two aspects of service function chaining, for example, the logical chain identifier and the particular instance of an active chain. In general, the number of logical chains, but the number of active instances may be large per chain.

Hierarchical Chaining Gateway Architecture

Figure 2:
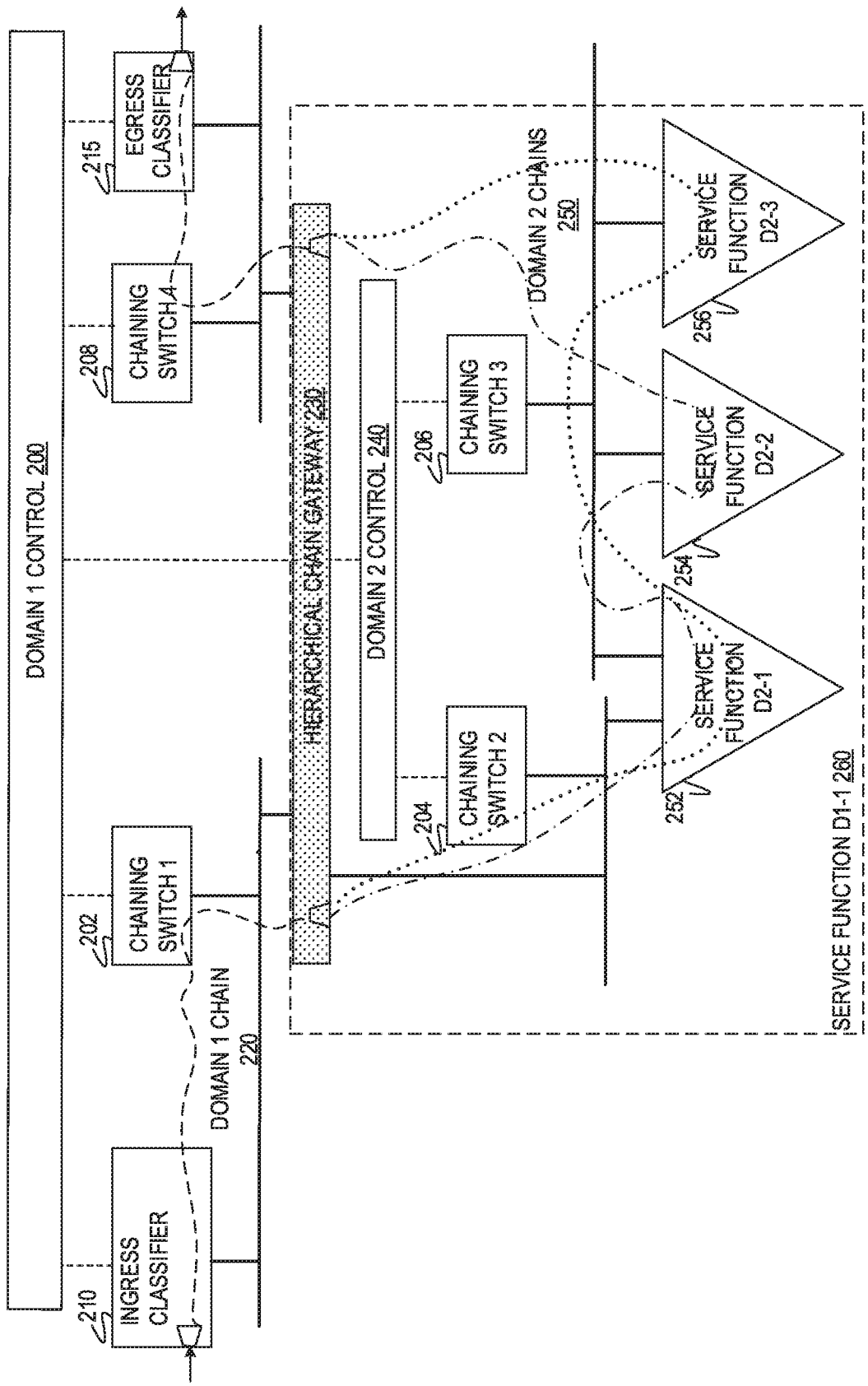
FIG. 2 is a block diagram of an example networking system using hierarchical Chaining Gateways (hCGs) to couple hierarchical service function chains.

FIG. 2 is a block diagram of an example networking system using hierarchical Chaining Gateways (hCGs) to couple hierarchical service function chains. FIG. 2 includes at least a control logic in each domain in a hierarchy of domains (e.g., Domain 1 Control 200, Domain 2 Control 240, etc.), an ingress classifier 210, a plurality of chaining switches (e.g., Chaining Switch 1 202, Chaining Switch 2 204, Chaining Switch 3 206, Chaining Switch 4 208, etc.), and an egress classifier 215. Moreover, FIG. 2 includes a hierarchical Chaining Gateway (hCG) 230 that is deployed between Domain 1 and Domain 2. The hCG is communicatively coupled to both Domain 1 Control 200 and Domain 2 Control 240, and is capable of interfacing with each domain using its corresponding domain specific chain protocol.

Ingress classifier 210 generally receives a service packet and route the service packet to a plurality of the networking components (e.g., Chaining Switch 1 202, Chaining Switch 4 208, etc.). In this implementation, ingress classifier 210 receives a service packet without the destination address corresponding to the address of Chaining Switch 1 202. Ingress classifier 210 determines the network component Chaining Switch 1 202 to forward the service packet based on an inspection of the payload of the service packet. The ingress classifier 210 identifies the service packet through a formatted data unit, such as a header, tail, and/or other identifying information. The identifying information matching ingress classifier policy indicates to ingress classifier 210 that a given packet should undergo at least one service function D1-1 260, and as such is part of Domain 1 Chain 220. Ingress classifier 210 identifies an address of the chaining switch (e.g., Chaining Switch 1 202) and a path at the head of the chain (e.g., the head of Domain 1 Chain 220), and thus forwarding the service packet to the identified chaining switch and the path.

Chaining switches, such as Chaining Switch 1 202 to Chaining Switch 4 208, generally refer to networked computing devices, which may establish data connections with other networking components and/or forward network packets accordingly. Implementations of chaining switches may include, but are not limited to, a multi-port network device, a multi-layer switch, a media access control (MAC) switch, a router, a virtual switch, or any other type of networking component capable of receiving and forwarding service packets. Although FIG. 2 illustrates each chaining switch as a single networking component, implementations should not be limited as the service packet may be routed among multiple networking components.

A service packet passing through service function chains is generally considered a networking packet or a data packet, which is a formatted unit of data carried by the networking system. For example, a data packet and/or a data frame may include wire formats for standardizing portions of the packet. A packet may also include at least two kinds of data, namely, network control information and payload (e.g., user data). The network control information provides data for the networking system to deliver the payload to the appropriate destination. For example, the network control information may be part of an open systems interconnection (OSI) model, and as such, may include the data that characterizes and standardizes the internal communication functions by partitioning the network control into various abstract layers, such as layers one through layers seven (L1-L7). This network control information may be found within the headers and/or trailers.

A service function, such as, service function D1-1 260, service function D2-1 252, service function D2-2 254, service function D2-3 256, is provided by the network carrier for processing data packets. Therefore, a service function can refer to a service that the networking carrier wishes to inject between networking nodes during transportation of data packets. Each service function represents at least one segment of the service function chain. For example, the service function chain may consist of various service functions during transportation of a particular packet. In this manner, the service function represents at least one of these various service functions, thus creating a hop that performs the service function on the packet.

A service function chain may include a single service function or a combination of multiple service functions. Each service function represents a different service provided by the networking carrier to process a service packet during transportation. For example, the first service function in Domain 2 Chain 250 (e.g., Service Function D2-1 252) may include a deep packet inspection, while the second service function (e.g., Service Function D2-2 254) may process voice stream, and the third service function (e.g., Service Function D2-3 256) may process video stream. Each of the service function(s) may reside on a virtual network, which generally is a virtual machine that hosts each of the service functions. Each virtual machine may host multiple service functions or may host an individual service function. Multiple virtual machines can host a single service function as well.

Egress classifier 215 is a component within the networking system that receives a packet upon operations of the service functions, and routes the packet upon egress of the networking system. In one implementation, egress classifier 215 may determine the port in which to egress the packet.

In FIG. 2, a service function chain in Domain 1 is coupled to two service function chains in Domain 2 in a hierarchical fashion. From the point of view of Domain 1 Control 200, the entire Domain 2 is simply a single service function, e.g., Service Function D1-1 260, along Domain 1 Chain 220. From the point of view of Domain 2 Control 240, the upper level chain in Domain 1 is only visible to hierarchical Chaining Gateway (hCG) 230. Service packets entering Domain 2 are classified by hierarchical Chaining Gateway (hCG) 230 into one of two Domain 2 Chains 250. The first Domain 2 Chain passes through service functions D2-1 252 and D2-2 254. The second Domain 2 Chain passes through service functions D2-1 252 and D2-3 256. In this example, the chain nesting could be extended into a third domain (not shown), because each of the service functions D2-1 252 to D2-3 256 could also be a new domain under Domain 2 in the hierarchy of domains.

The service chains in each of the domains in the example can be configured independently to simplify the operations. Hierarchical Chaining Gateway (hCG) 230 is the only networking component that knows the existence of both Domain 1 and Domain 2. Moreover, hierarchical Chaining Gateway (hCG) 230 knows the chaining protocol(s) used in both Domain 1 and Domain 2 to interact with Domain 1 Control 200 and Domain 2 Control 240.

Specifically, hierarchical Chaining Gateway (hCG) 230 includes at least two interfaces. While interacting with Domain 1 Control 200 at the first interface, hierarchical Chaining Gateway (hCG) 230 uses the chaining protocol of Domain 1. On the other hand, while interacting with Domain 2 Control 240 at the second interface, hierarchical Chaining Gateway (hCG) 230 uses the chaining protocol of Domain 2.

Note that hierarchical Chaining Gateway (hCG) 230 does not need to know the services and details of Domain 1. Since hierarchical Chaining Gateway (hCG) 230 translates the chaining protocols between Domain 1 and Domain 2, the chaining protocol used in Domain 1 (e.g., a Multiprotocol Label Switching (MPLS) chaining protocol) can be different from the chaining protocol used in Domain 2 (e.g., a Media Access Control (MAC) address based chaining protocol). It is also possible for Domain 1 and Domain 2 to use the same chaining protocol.

In some cases, the ingress service packet and the egress service packet are processed at the same hierarchical Chaining Gateway (hCG) instance 230. In other cases, hierarchical Chaining Gateway (hCG) 230 can be divided into multiple physical devices and/or virtual instances. The process will be distributed to the multiple instances of hierarchical Chaining Gateways (hCGs) 230 in a single domain. The multiple instances of hCGs are synchronized and stored in an hCG database.

When Domain 2 Chain 250 terminates, Domain 2 Control 240 will deliver the service packet back to hierarchical Chaining Gateway (hCG) 230 for chain termination. Hierarchical Chaining Gateway (hCG) 230 retrieves the previous key identifier from the metadata encoded in the packet, and uses the key identifier as an index to locate the previous header corresponding to the Domain 1 service packet. Hierarchical Chaining Gateway (hCG) 230 then re-generates the headers for Domain 1 Chain 220, transforms the service packet from a Domain 2 service packet to a Domain 1 service packet, and forwards the service packet back along the Domain 1 Chain 220.

Service Packet Transformation

Figure 3A:
FIG. 3A is a block diagram of an example ingress service packet at a hierarchical Chaining Gateway (hCG)

FIG. 3A is a block diagram of an example ingress service packet at a hierarchical Chaining Gateway (hCG). Ingress packet 300 as illustrated in FIG. 3A includes a domain 1 destination address (e.g., D1 DA 310), a domain 1 source address (e.g., D1 SA 315), a domain 1 virtual local area network (VLAN) tag (e.g., D1 VLAN Tag 320), a domain 1 segment routing header (e.g., D1 Segment Routing Header 325), a domain 1 meta data header (e.g., D1 Network Service Header 330), and original packet 335. Note that FIG. 3A is for illustration purposes only. An ingress service packet may not include at least one field. For example, at least one of D1 VLAN Tag 320, D1 Segment Routing Header 325, D1 Network Service Header 330, etc., may not be included. Furthermore, an ingress service packet may include any number of additional fields not illustrated in FIG. 3A.

Figure 3B:
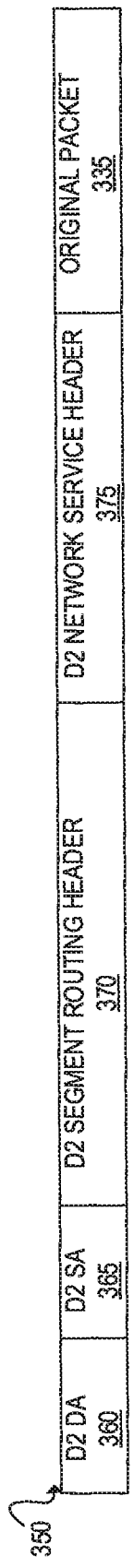
FIG. 3B is a block diagram of an example egress service packet at a hierarchical Chaining Gateway (hCG)

Similarly, FIG. 3B is a block diagram of an example egress service packet at a hierarchical Chaining Gateway (hCG). Egress packet 350 as illustrated in FIG. 3B includes a domain 2 destination address (e.g., D2 DA 360), a domain 2 source address (e.g., D2 SA 365), a domain 2 segment routing header (e.g., D2 Segment Routing Header 370), a domain 2 network service header (e.g., D2 Network Service Header 375), and original packet 335. Note that the length of a particular type of header (e.g., the segment routing header) in ingress packet 300 may be different from the length of the same type of header (e.g., segment routing header) in egress packet 350. Also, a header that is included in ingress packet 300 may not be included in egress packet 350. Similarly, a header that is included in egress packet 350 may not be included in ingress packet 300. Also, note that FIG. 3B is for illustration purposes only. An egress service packet may not include at least one field. For example, at least one of D2 Segment Routing Header 370 and D2 Network Service Header 375 may not be included. Furthermore, an egress service packet may include any number of additional fields not illustrated in FIG. 3B.

The hierarchical Chaining Gateway (hCG) receives an ingress packet via its interface with Domain 1, transforms the packet to an egress packet and sends the packet via its interface with Domain 2. The chaining information may be carried by an L2 Header, a Segment Route Header, a Metadata Header, etc. The chaining headers of service packets entering the hierarchical Chaining Gateway at Domain 1 will be removed and stored in a storage (e.g., a table in a memory) within the hierarchical Chaining Gateway that is deployed between Domain 1 and Domain 2. Before storing the chaining header, the hierarchical Chaining Gateway searches its internal database to determine whether a matching header exists. If a matching header is already stored, then the stored key identifier for the matching header is retrieved. If there is no matching entry for the header in the storage, then a new entry associated with the chaining header is added. As such, a new key identifier will be created and stored in the new entry. The hierarchical Chaining Gateway (hCG) then re-classifies the frame based on the service packet, and if applicable, based on the previous chaining headers. This re-classification is used to determine a Domain 2 Chain associated with a new service packet transformed from the received service packet in Domain 1. Upon determining the Domain 2 Chain, the hierarchical Chaining Gateway also forms a new chaining header, which includes, e.g., D2 DA 360, D2 SA 365, D2 segment routing header 370, D2 network service header 375, etc. The service packet is then wrapped in the new chaining header. The previous key identifier for the Domain 1 chain can be encoded as metadata in the new service packet. The metadata can be a field in any part of the new service packet, such as, a header field or a field in the payload of the new service packet.

In some implementations, the previous key identifier is encoded in the new service packet corresponding to Domain 2 that is generated by the hierarchical Chaining Gateway (hCG). The exact encoding of this metadata can vary depending on the chaining protocol used in Domain 2. For MAC address based chaining protocols, the key identifier can be encoded as a sub-field of the segment MAC address that is used for MAC chaining. For example, the sub-field can be a segment of a compact MAC chaining address or a Network Service Header. Other alternatives for encoding the key identifier can be used as well.

In some implementations, the key identifier also can be encoded as metadata within a meta data header, such as, a Network Service Header, if available. In some implementations, the key identifier can be encoded as metadata in a VLAN tag. In some implementations, the key identifier is encoded as metadata in an MPLS label. In some implementations, the key identifier can be encoded as metadata within a higher layer field of the service packet.

It is also possible to build a hierarchical Chaining Gateway (hCG) that does not rely on encoding metadata in the packets. For example, a hierarchical Chaining Gateway (hCG) can use the hCG classifier to re-classify a service packet terminating at the hCG from a lower level domain chain into an upper level domain chain.

In some cases, when applications are under a single operational authority where all the information needed about the upper level domain chains is available at the hierarchical Chaining Gateway (hCG), the hCG uses the hCG classifier to re-classify a service packet without encoding metadata in the packets. On the other hand, when the applications are under multiple different operational authorities, the hCG uses the metadata encoding to transform the service packets.

Chaining Header Storage at Hierarchical Chaining Gateway

Figure 4:
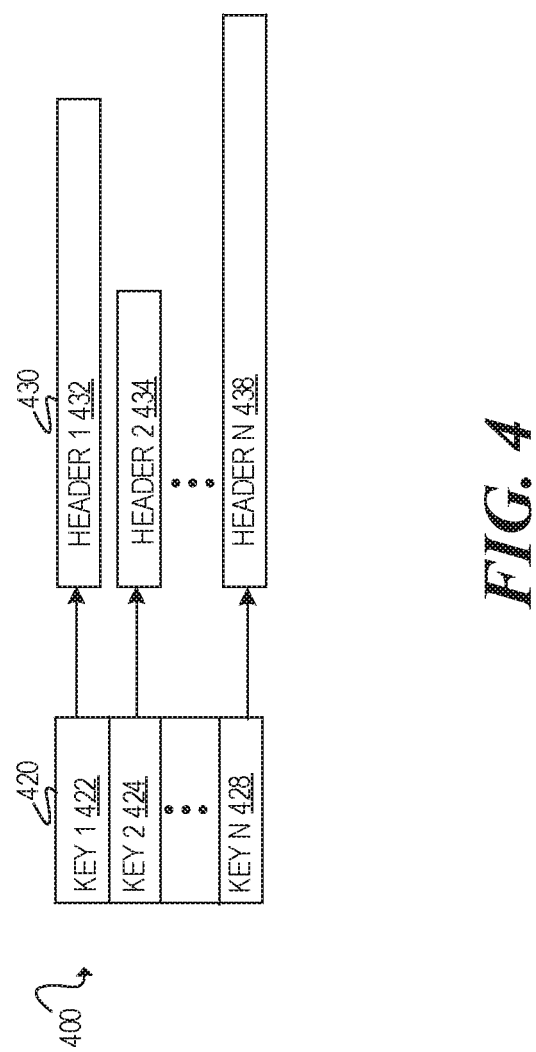
FIG. 4 is a block diagram of an example storage for storing chain headers at a hierarchical Chaining Gateway (hCG)

FIG. 4 is a block diagram of an example storage for storing chaining headers at a hierarchical Chaining Gateway (hCG). Specifically, a chaining header storage 400 is stored at the hCG. Chaining header storage 400 includes at least a plurality of key identifiers that can be stored in any data structure 420, such as, a list, a table, an array, a stack, a queue, a set, etc. Here, data structure 420 includes Key 1 422, Key 2 424, . . . , and Key N 428. Each key identifier is further linked to a header 430. For example, Key 1 422 is linked to Header 1 432; Key 2 424 is linked to Header 2 434; . . . ; and, Key N 428 is linked to Header N 438.

In an example of hierarchical domain chains, assuming that chaining headers storage 400 is deployed at a first hierarchical Chaining Gateway (hCG$_1$) between Domain 1 and Domain 2 as illustrated in FIG. 1. Moreover, a second chaining headers storage is deployed at a second hierarchical Chaining Gateway (hCG$_2$) between Domain 2 and Domain 3. Further, assume that Domain 1 is an upper level domain compared to Domain 2, and Domain 2 is an upper level domain compared to Domain 3.

When a service packet enters Domain 2 from Domain 1, the first hierarchical Chaining Gateway (hCG$_1$) will remove the chaining headers of the service packet, and store the chaining headers in the first chaining headers storage at the first hierarchical Chaining Gateway (hCG$_1$) that is deployed between Domain 1 and Domain 2. In some implementations, before storing the chaining headers of the service packet, the first hierarchical Chaining Gateway (hCG$_1$) searches the first chaining headers storage to determine whether a matching header exists. If there is no matching entry for the header in the chaining headers storage at the hCG$_1$, then a new entry associated with the chaining header is added to the first chaining storage at hCG$_1$. Also, a new key identifier (e.g., Key$_1$) will be created and stored in the new entry. The first hierarchical Chaining Gateway (hCG$_1$) then re-classifies the service packet to determine a Domain 2 chain associated with a transformed Domain 2 service packet. The previous key identifier (e.g., Key$_1$) corresponding to the Domain 2 chaining header can be encoded as metadata in the new service packet. The metadata can be a field in any part of the new service packet, such as, a header field or a field in the payload of the new Domain 2 service packet. Then, the first hierarchical Chaining Gateway (hCG$_1$) forms a new chaining header, which may include the new key identifier (e.g., Key$_2$) or the retrieved key identifier (e.g., Key$_1$). The Domain 2 service packet is then wrapped in the new chaining headers and transmitted to Domain 2 by $hCG_1$.

Next, when the transformed Domain 2 service packet passes through a Domain 2 service function that has a nested service function chain in a lower level domain (e.g., service function 154 in FIG. 1), the Domain 2 service packet will be sent to the second hierarchical Chaining Gateway ($hCG_2$) that is located between Domain 2 and Domain 3. Similarly, before storing the chaining headers of the Domain 2 service packet, the second hierarchical Chaining Gateway ($hCG_2$) searches the second chaining headers storage to determine whether a matching header exists. If there is no matching entry for the header in the chaining headers storage at the $hCG_2$, then a new entry associated with the Domain 2 service packet chaining header is added to the second chaining storage at $hCG_2$. Also, a new key identifier (e.g., $Key_2$) will be created and stored in the new entry. Note that, here, the new key identifier (e.g., $Key_2$) corresponds to a chaining header in Domain 2, which can, by itself, be a key identifier (e.g., $Key_1$) in another chaining headers storage at a different hierarchical Chaining Gateway (e.g., $hCG_1$) that is located in a higher level than the current hierarchical Chaining Gateway (e.g., $hCG_2$) in the hierarchy of domains.

The second hierarchical Chaining Gateway ($hCG_2$) then re-classifies the Domain 2 service packet to determine a Domain 3 chain associated with a transformed Domain 3 service packet. The previous key identifier (e.g., $Key_2$) corresponding to the Domain 2 chaining header can be encoded as metadata in the new Domain 3 service packet. Then, the second hierarchical Chaining Gateway ($hCG_2$) forms a new chaining header, which may include the new key identifier (e.g., $Key_2$). The Domain 3 service packet is then wrapped in the new chaining headers and transmitted to Domain 3 by $hCG_2$.

When Domain 3 Chain terminates, Domain 3 Control will deliver the Domain 3 service packet to the second hierarchical Chaining Gateway ($hCG_2$) for chain termination. The second hierarchical Chaining Gateway ($hCG_2$) searches its chaining headers storage to determine whether there is a match for the chaining headers. In this example, $hCG_2$ will retrieve the previous key identifier (e.g., $Key_2$) from the metadata encoded in the Domain 3 service packet, and uses this key identifier (e.g., $Key_2$) as an index to locate the previous header corresponding to the Domain 2 service packet. The second hierarchical Chaining Gateway ($hCG_2$) then re-generates the headers for Domain 2 Chain using the previous header stored at the second chaining headers storage, transforms the service packet from a Domain 3 service packet to a Domain 2 service packet, and forwards the service packet back along the Domain 2 Chain. In this example, the previous header includes a previous key identifier (e.g., $Key_1$) encoded as a metadata.

Subsequently, when Domain 2 Chain terminates, Domain 2 Control will deliver the Domain 2 service packet to the first hierarchical Chaining Gateway ($hCG_1$) for chain termination. The first hierarchical Chaining Gateway ($hCG_1$) searches its chaining headers storage to determine whether there is a match for the chaining headers, which includes the previous key identifier $Key_1$ in this example. Then, $hCG_1$ will retrieve the previous key identifier (e.g., $Key_1$) from the metadata encoded in the Domain 2 service packet, and uses this key identifier (e.g., $Key_1$) as an index to locate the previous header corresponding to the Domain 1 service packet. The first hierarchical Chaining Gateway ($hCG_1$) then re-generates the headers for Domain 1 Chain, transforms the service packet from a Domain 2 service packet to a Domain 1 service packet, and forwards the service packet back along the Domain 1 Chain.

Note that different headers stored in chaining header storage at a particular hierarchical chaining gateway may be of different lengths. This is true especially when there are multiple different levels of domains, which lead to service packets having nested headers. Regardless of the length of each stored header, the lengths of the key identifiers stored in the same chaining header storage at the same hierarchical Chaining Gateway (hCG) remain the same. Therefore, even when the service packet enters layers of hierarchical domains with deeply nested headers, the header of the transformed service packet will have the corresponding key identifier stored in the chaining header storage at the current hCG. As such, the length of the service packet does not grow as the length of the nested headers grows. This allows the disclosed hierarchical Chaining Gateway architecture to scale up and accommodate the needs of global carrier service providers.

Processes to Transform a Service Packet Using Hierarchical Chaining Gateway

Figure 5:
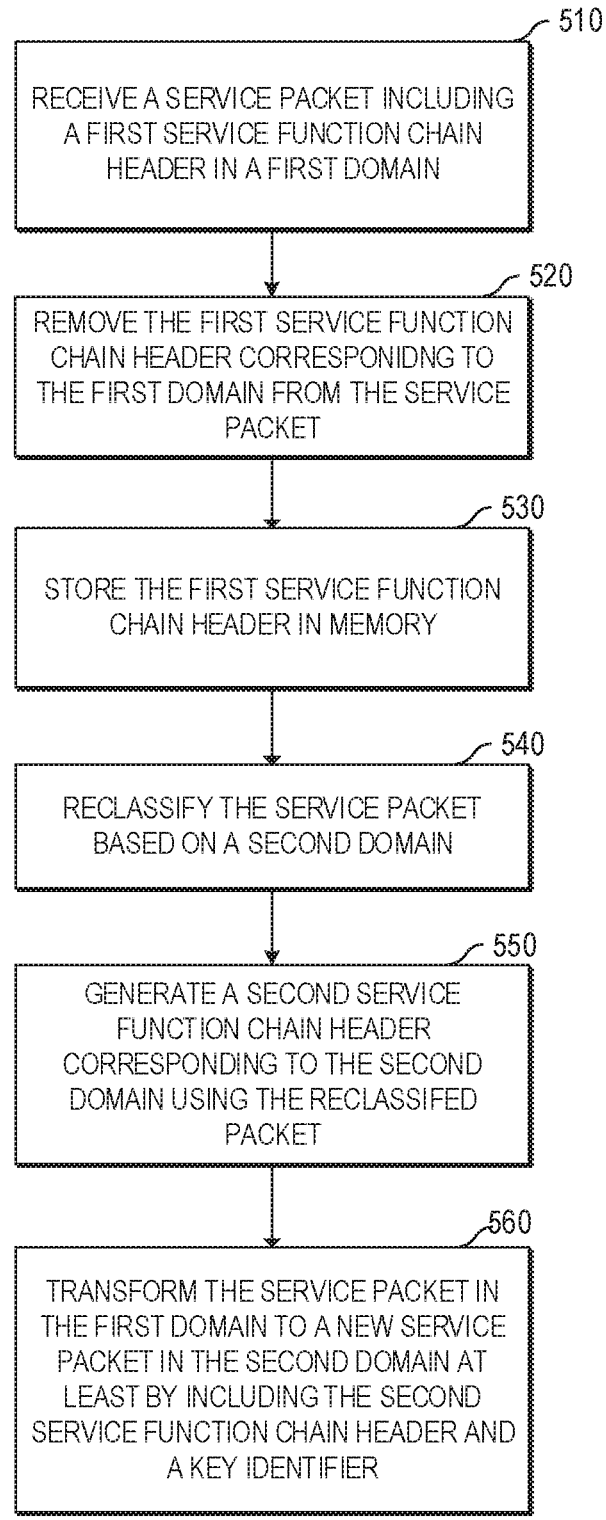
FIG. 5 is a flowchart of an example process to transform an ingress service packet in a first domain to a new service packet in a second domain.
Figure 6:
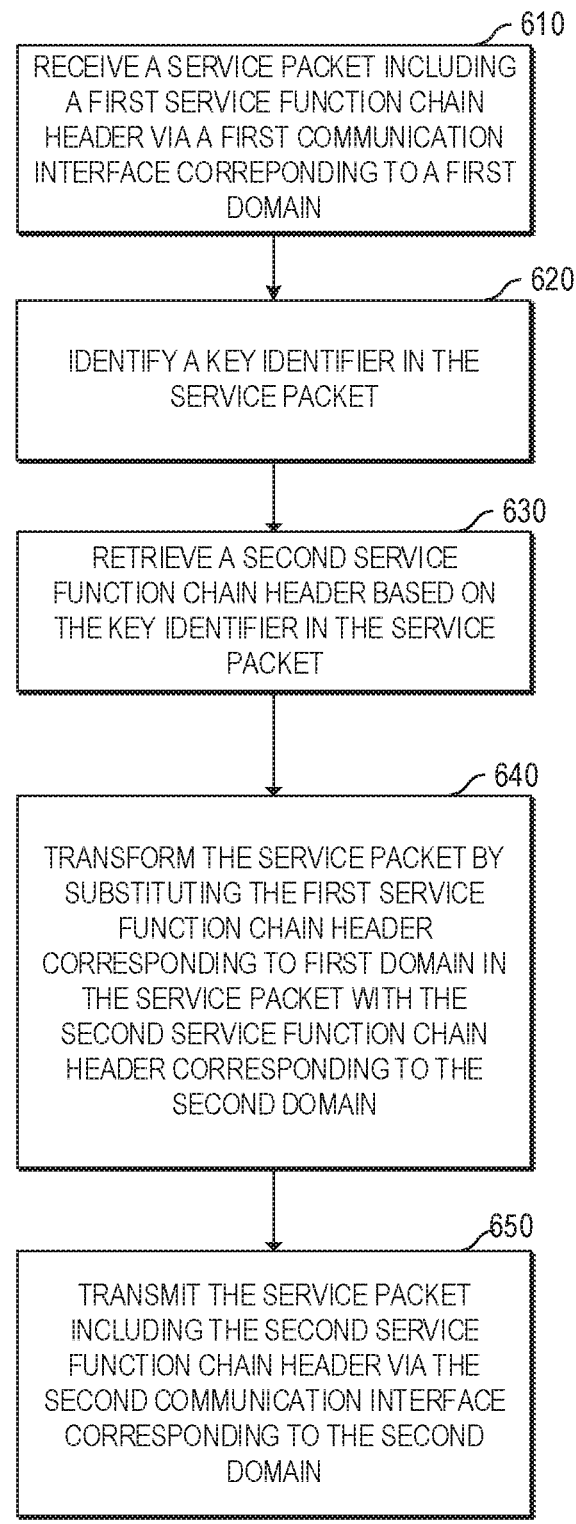
FIG. 6 is a flowchart of an example process to transform an egress service packet in a first domain to a new service packet in a second domain.
Figure 7:
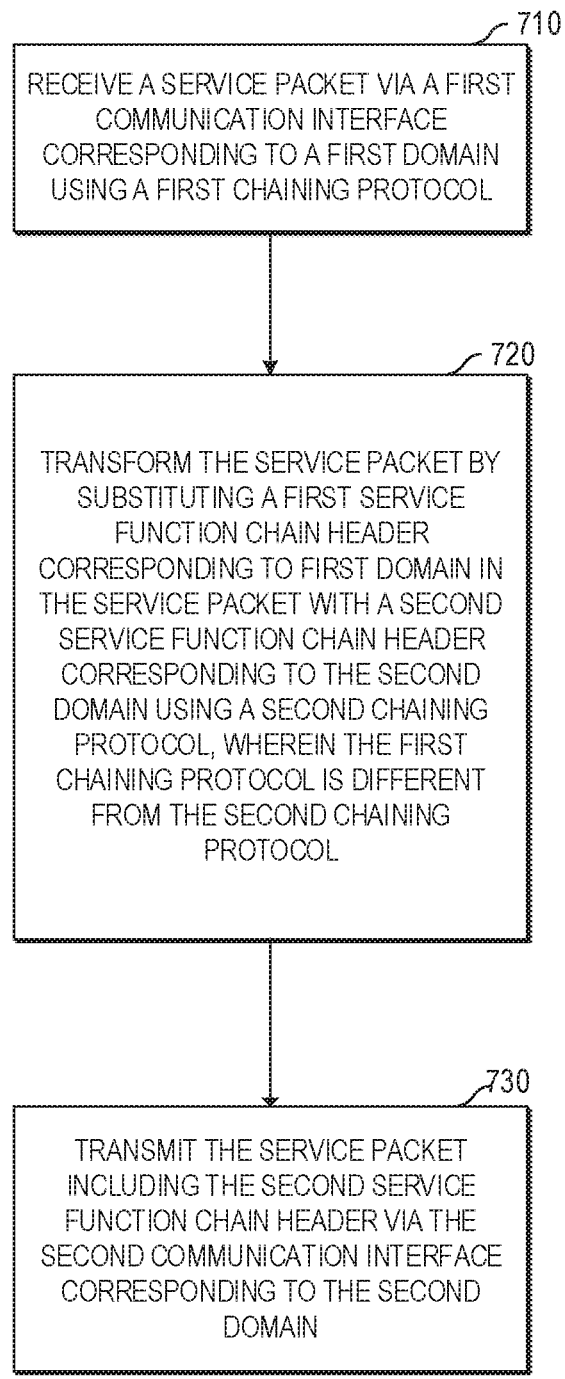
FIG. 7 is a flowchart of an example process to transform a service packet between domains that use different chaining protocols.

In discussing FIGS. 5-7, references may be made to the components in FIGS. 1-4 to provide contextual examples. In one implementation, the hierarchical Chaining Gateway (hCG) 230 as in FIG. 2 executes operations 510-560 to transform an ingress packet from Domain 1 to Domain 2. In one implementation, the hierarchical Chaining Gateway (hCG) 230 as in FIG. 2 executes operations 610-660 to transform an egress packet from Domain 2 to Domain 1. Further, although FIGS. 5-7 are described as implemented by a server, it may be executed on other suitable components. For example, FIGS. 5-7 may be implemented in the form of executable instructions on a machine-readable storage medium 820 as in FIG. 8.

FIG. 5 is a flowchart of an example process to transform an ingress service packet in a first domain to a new service packet in a second domain using a hierarchical Chaining Gateway (hCG). First, a networking component (e.g., the hCG) receives a service packet including a first service function chain header in a first domain (operation 510). In one implementation, the service packet may be formatted for compliance with IEEE 802 standards. In other implementations, the service packet is in a format such as an open systems interconnection model (OSI).

Upon receiving the service packet, the networking component removes the first service function chain header corresponding to the first domain from the service packet (operation 520). In some implementations, the service function chain includes at least one service function, which may be provided to the packet when routing the packet from node to node within a networking system. In some examples, the service function chain includes at least one virtual rather than physical functions. Therefore, in a network virtualization environment, the forwarding of the service packet may refer to passing a service packet between different processing functions (e.g., with an updated header) without actually forwarding the packet from node to node within the networking system.

In some implementations, the service function may include a nested service function chain at a lower level domain in a hierarchy of domains. The chaining information may be carried by an L2 Header, a Segment Route Header, a Metadata Header, etc.

Next, the networking component stores the first service function chain header in a memory (operation 530). Before storing the chaining header, the hierarchical Chaining Gateway searches its internal database to determine whether a matching header exists. If the header is already stored in the memory, then the stored key identifier for the matched header is retrieved. If there is no matching entry for the header in the storage, then a new entry associated with the chaining header is added. The new entry can be added to, for example, a list, a table, an array, a stack, a queue, a set, and so on, in the memory.

After storing the first service function chain header, the networking component reclassifies the service packet based on a second domain (operation 540). Then, the networking component generates a second service function chain header corresponding to the second domain using the reclassified packet (operation 550). Thereafter, the networking component transforms the service packet in the first domain to a new service packet in the second domain at least by including the second service function chain header and a key identifier. Note that even though the networking component reclassifies the service packet after the service packet enters the second domain here, the networking component can also reclassify the service packet prior to the service packet enters the second domain. For example, when a hCG determines that a service function branches to another service function that comprises a hierarchy of service function chains, the networking component can reclassify the service packet in the same manner.

In some implementations, the first domain is an upper level domain in a hierarchy of domains; and, the second domain is a lower level domain in the hierarchy of domains. Moreover, the upper level domain can use a first chaining protocol; and, the lower level domain can use a second and different chaining protocol.

In some implementations, the key identifier is encoded as metadata in a field of the new service packet. The field of the new packet can include, but are not limited to, at least one of a segment route header, a Media Access Control (MAC) header, a network service header, a virtual local area network (VLAN) tag, a Multi-Protocol Label Switching (MPLS) label, a higher layer field of the new service packet, etc.

In some implementations, the networking component further searches in the memory for the first service function chain header. If a match for the first service function chain header is found, the networking component retrieves the key identifier associated with the first service function chain header. On the other hand, if no match for the first service function chain header is found, the networking component creates a new key identifier associated with the first service function chain header, and stores the first service function chain header with the new key identifier in the memory.

FIG. 6 is a flowchart of an example process to transform an egress service packet in a second domain to a new service packet in a first domain using a hierarchical Chaining Gateway (hCG). Specifically, the networking component (e.g., hCG) receives a service packet including a first service function chain header via a first communication interface corresponding to a first domain (operation 610). Next, the networking component identifies a key identifier in the service packet (operation 620). The networking component further retrieves a second service function chain header based on the key identifier in the service packet (operation 630). Then, the networking component transforms the service packet by substituting the first service function chain header corresponding to the first domain in the service packet with the second service function chain header corresponding to a second domain (operation 640). In addition, the networking component transmits the service packet including the second service function chain header via a second communication interface corresponding to the second domain (operation 650). Here, the first domain is an upper level domain in a hierarchy of domains; and, the second domain is a lower level domain in the hierarchy of domains. Moreover, a length corresponding to the key identifier remains same as a number of levels in the hierarchy of domains increases.

FIG. 7 is a flowchart of an example process to transform a service packet between domains that use different chaining protocols using a hierarchical Chaining Gateway (hCG). During operations, a networking components receives a service packet via a first communication interface corresponding to a first domain using a first chaining protocol (operation 710). Then, the networking component transforms the service packet by substituting a first service function chain header corresponding to the first domain in the service packet with a second service function chain header corresponding to a second domain using a second chaining protocol (operation 720). It shall be noted that the second chaining protocol used by the second domain here is a different chaining protocol from the first chaining protocol used by the first domain. Next, the networking component transmits the service packet including the second service function chain header via a second communication interface corresponding to the second domain (operation 730). Note that, in this example, the first domain (or the second domain) can be either an upper level domain or a lower level domain in a hierarchy of domains.

In some implementations, the networking component further determines whether the first service chain header is stored in the memory. It stores the first service function chain header in the memory if the first service chain header is not already stored in the memory. Here, the first service function chain header is identified by a first key identifier. On the other hand, the networking component retrieves the first key identifier corresponding to the first service function chain header if the first service chain header is stored in the memory. The networking component then includes the first key identifier in the service packet prior to transmitting the service packet via the second communication interface corresponding to the second domain.

In some implementations, the first key identifier further includes a second key identifier corresponding to a third service function chain header stored in another hierarchical chaining gateway (hCG) between a third domain and the first domain. In this case, the third domain is a lower level domain to the first domain in a hierarchy of domains.

In some examples, the key identifier is included in the service packet as at least one of: a segment route header, a Media Access Control (MAC) header, a network service header, a virtual local area network (VLAN) tag, a Multi-Protocol Label Switching (MPLS) label, a higher layer field of the new service packet, etc.

In some examples, the networking component, such as an hCG, can classify the service packet into at least one service function chains in the second domain prior to transmitting the service packet via the second communication interface corresponding to the second domain.

In some examples, the at least one service function chains in the second domain appear as a single service function to entities in the first domain. Specifically, the first domain here is an upper level domain in a hierarchy of domains; and, the second domain is a lower level domain in the hierarchy of domains.

Figure 8:
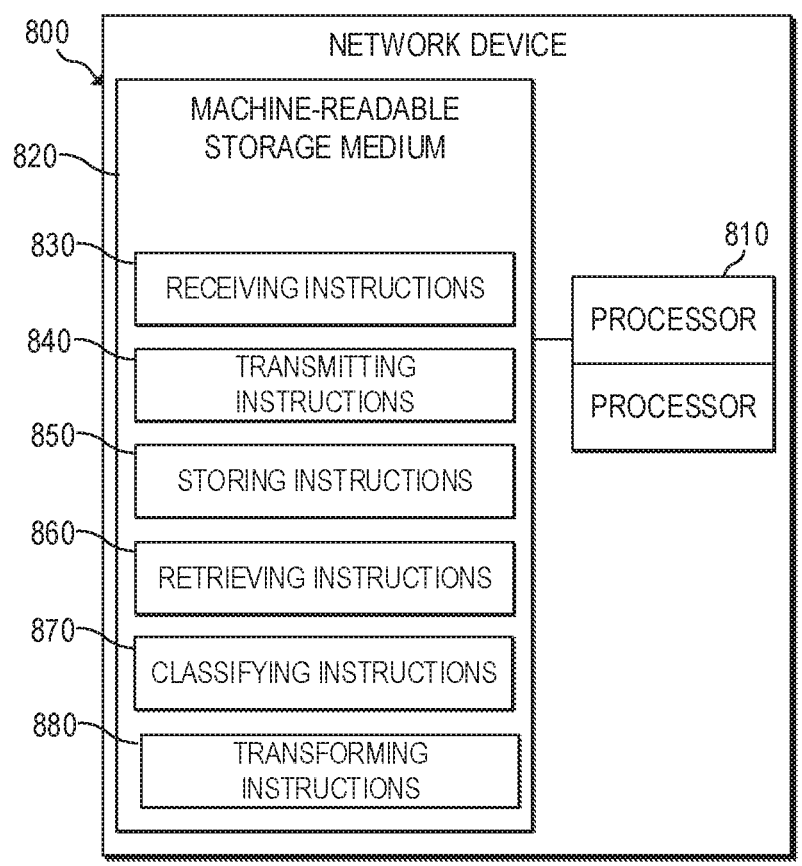
FIG. 8 is a block diagram of an example network device to transform a service packet from a first domain to a second domain.

Network Device to Transform a Service Packet Using Hierarchical Chaining Gateway FIG. 8 is a block diagram of an example network device with at least one processor 810 to execute instructions 830-880 within a machine-readable storage medium 820 to transform a service packet from a first domain to a second domain using a hierarchical Chaining Gateway (hCG). Although the network device 800 includes the at least one processor 810 and machine-readable storage medium 820, it may also include other components that would be suitable to one skilled in the art. For example, network device 800 may include an additional processing component and/or storage. In another implementation, the networking component (e.g., hCG 230 in FIG. 2) executes instructions 830-880. Network device 800 is an electronic device with the at least one processor 810 capable of executing instructions 830-880, and as such implementations of network device 800 include a mobile device, server, data center, networking device, client device, computer, or other type of electronic device capable of executing instructions 830-880. The instructions 830-880 may be implemented as methods, functions, operations, and other processes implemented as machine-readable instructions stored on the storage medium 820, which may be non-transitory, such as hardware storage devices (e.g., random access memory (RAM), read only memory (ROM), erasable programmable ROM, electrically erasable ROM, hard drives, and flash memory).

The at least one processor 810 may fetch, decode, and execute instructions 830-880 to transform a service packet in a first domain to new service packet in a second domain. In one implementation, upon executing instructions 830 to receive a service packet, the at least one processor 810 may execute the instructions 850 to store the service function chaining headers before executing instructions 840 and 880 to transform and transmit the service packet. In another implementation, upon executing instructions 830 to receive a service packet, the at least one processor 810 may execute the instructions 860 to retrieve the service function chaining headers before executing instructions 840 and 880 to transform and transmit the service packet. In yet another implementation, upon executing instructions 830 to receive a service packet, the at least one processor 810 may execute the instructions 870 to classify the service packet before executing instructions 840 and 880 to transform and transmit the service packet.

Specifically, the at least one processor 810 executes instructions 830-880 to: receive a service packet including a first service function chain header via the first communication interface corresponding to the first domain; remove the first service function chain header corresponding to the first domain from the service packet; identify a first key identifier in the service packet; store the first service function chain header in the memory in response to the first service chain header not being stored in the memory; determine whether the first service chain header is stored in the memory by searching in the memory for the first service function chain header; retrieve the first key identifier corresponding to the first service function chain header in response to the first service chain header being stored in the memory; create a new key identifier associated with the first service function chain header in response to no match for the first service function chain header being found; store the first service function chain header with the new key identifier in the memory; classify the service packet into at least one service function chain in a second domain; generate a second service function chain header corresponding to the second domain using the reclassified packet; transform the service packet in the first domain to a new service packet in the second domain at least by including the second service function chain header and the key identifier, or by substituting a first service function chain header corresponding to the first domain in the service packet with a second and different service function chain header corresponding to the second domain; transmit the service packet including the second and different service function chain header via the second communication interface corresponding to the second domain; etc.

The machine-readable storage medium 820 includes instructions 830-880 for the processor 810 to fetch, decode, and execute. In another example, the machine-readable storage medium 820 may be an electronic, magnetic, optical, memory, storage, flash-drive, or other physical device that contains or stores executable instructions. Thus, the machine-readable storage medium 820 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 820 may include an application and/or firmware which can be utilized independently and/or in conjunction with the at least one processor 810 to fetch, decode, and/or execute instructions of the machine-readable storage medium 820. The application and/ or firmware may be stored on the machine-readable storage medium 820 and/or stored on another location of the network device 800.

We claim:

1. A network device comprising:
a memory; and
at least one processor configured to execute instructions stored in the memory, wherein the at least one processor to:
receive a service packet including a first service function chain header in a first domain, wherein the service packet transfers information to support traffic flow through a service function;
remove the first service function chain header corresponding to the first domain from the service packet;
store the first service function chain header in the memory, wherein the first service function chain header is associated with an identifier, wherein the identifier is stored in a database as a previous chaining header;
reclassify the service packet based on a second domain, wherein the first domain and the second domain are related in a nested hierarchy of domains that electronically communicate using service packets transmitted through the network device, and
wherein the nested hierarchy of domains hides information between the first domain and the second domain;
generate a second service function chain header corresponding to the second domain using the reclassified packet; and
transform the service packet in the first domain to a new service packet in the second domain at least by including the second service function chain header and the identifier associated with the previous chaining header, wherein the information hidden between the first domain and the second domain is restored to the second service function chain header.

2. The network device of claim 1, wherein the first domain comprises an upper level domain in a hierarchy of domains, and wherein the second domain comprises a lower level domain in the hierarchy of domains.

3. The network device of claim 2, wherein the upper level domain uses a first chaining protocol, and wherein the lower level domain uses a second and different chaining protocol.

4. The network device of claim 1, wherein the identifier is encoded as metadata in a field of the new service packet.

5. The network device of claim 4, wherein the field of the new packet comprises at least one of: a segment route header, a Media Access Control (MAC) header, a network service header, a virtual local area network (VLAN) tag, a Multi-Protocol Label Switching (MPLS) label, and a higher layer field of the new service packet.

6. A network device of claim 1, wherein the at least one processor further to:
search in the memory for the first service function chain header;
in response to a match for the first service function chain header being found,
retrieving the identifier associated with the first service function chain header; and
in response to no match for the first service function chain header being found,
creating a new identifier associated with the first service function chain header; and
storing the first service function chain header with the new identifier in the memory.

7. A hierarchical chaining gateway (hCG) comprising:
a memory;
at least one processor configured to execute instructions stored in the memory;
a first communication interface corresponding to a first domain using a first chaining protocol; and
a second communication interface corresponding to a second domain using a second chaining protocol, wherein the first chaining protocol is different from the second chaining protocol,
wherein the first domain and the second domain are related in a nested hierarchy of domains that electronically communicate using service packets transmitted through the hierarchical chaining gateway (hCG),
wherein the nested hierarchy of domains hides information between the first domain and the second domain, and
wherein the at least one processor to:
receive a service packet including a first service function chain header via the first communication interface corresponding to the first domain, wherein the service packet transfers information to support traffic flow through a service function;
identify a key identifier in the service packet, wherein the key identifier is identified by searching a database for a previous chaining header;
retrieve a second service function chain header based on the key identifier in the service packet;
transform the service packet from the first domain to the second domain by substituting the first service function chain header corresponding to first domain in the service packet with the second service function chain header corresponding to the second domain; and
transmit the service packet including the second service function chain header via the second communication interface corresponding to the second domain, wherein the information hidden between the first domain and the second domain is restored to the second service function chain header.

8. The hierarchical chaining gateway of claim 7, wherein the first domain comprises a lower level domain in a hierarchy of domains, and wherein the second domain comprises an upper level domain in the hierarchy of domains.

9. The hierarchical chaining gateway of claim 7, wherein a length corresponding to the key identifier remains same as a number of levels in the hierarchy of domains increases.

10. A hierarchical chaining gateway (hCG) comprising:
a memory;
at least one processor configured to execute instructions stored in the memory;
a first communication interface corresponding to a first domain using a first chaining protocol; and
a second communication interface corresponding to a second domain using a second chaining protocol, wherein the first chaining protocol is different from the second chaining protocol,
wherein the first domain and the second domain are related in a nested hierarchy of domains that electronically communicate using service packets transmitted through the hierarchical chaining gateway (hCG),
wherein the nested hierarchy of domains hides information between the first domain and the second domain, and
wherein the at least one processor to:
receive a service packet via the first communication interface corresponding to the first domain, wherein the service packet transfers information to support traffic flow through a service function;
identify a key identifier in the service packet, wherein the key identifier is identified by searching a database for a previous chaining header;
transform the service packet from the first domain to the second domain by substituting a first service function chain header corresponding to the first domain in the service packet with a second and different service function chain header corresponding to the second domain; and
transmit the service packet including the second and different service function chain header via the second communication interface corresponding to the second domain, wherein the information hidden between the first domain and the second domain is restored to the second and different service function chain header.

11. The hierarchical chaining gateway (hCG) of claim 10, wherein the at least one processor further to:
determine whether the first service chain header is stored in the memory;
store the first service function chain header in the memory in response to the first service chain header not being stored in the memory, wherein the first service function chain header is identified by a first key identifier;
retrieve the first key identifier corresponding to the first service function chain header in response to the first service chain header being stored in the memory; and
include the first key identifier in the service packet prior to transmitting the service packet via the second communication interface corresponding to the second domain.

12. The hierarchical chaining gateway (hCG) of claim 11, wherein the first key identifier comprises a second key identifier corresponding to a third service function chain header stored in another hierarchical chaining gateway (hCG) between a third domain and the first domain, and wherein the third domain is an upper level domain to the first domain in a hierarchy of domains.

13. The hierarchical chaining gateway (hCG) of claim 11, wherein the first key identifier is included in the service packet as at least one of: a segment route header, a Media Access Control (MAC) header, a network service header, a virtual local area network (VLAN) tag, a Multi-Protocol Label Switching (MPLS) label, and a higher layer field of the new service packet.

14. The hierarchical chaining gateway (hCG) of claim 10, wherein the at least one processor further to:
classify the service packet into at least one service function chain in the second domain prior to transmitting the service packet via the second communication interface corresponding to the second domain.

15. The hierarchical chaining gateway (hCG) of claim 14, wherein the at least one service function chain in the second domain appear as a single service function to entities in the first domain, wherein the first domain comprises an upper level domain in a hierarchy of domains, and wherein the second domain comprises a lower level domain in the hierarchy of domains.

16. The hierarchical chaining gateway (hCG) of claim 7, wherein the service packet transfers information for implementing a deep packet inspection (DPI) service, firewall, tracking packet sizes, or encryption.

17. The hierarchical chaining gateway (hCG) of claim 7, wherein the first communication interface receives the service packet from an ingress classifier and the second communication interface transmits the service packet to an egress classifier.

18. The hierarchical chaining gateway (hCG) of claim 17, wherein the egress classifier determines a port to egress the service packet.

19. The network device of claim 1, the at least one processor further to:
generate a first endpoint and a second endpoint for the service packet, wherein the first endpoint and the second endpoint are limited to the first domain.

20. The network device of claim 1, the at least one processor further to:
prior to storing the first service function chain header in the memory, search the database for the previous chaining header.

* * * * *